United States Patent [19]

Mooney

[11] Patent Number: 4,678,391
[45] Date of Patent: Jul. 7, 1987

[54] APPARATUS FOR CONVERTING A TRANSFER TRUCK TO A FLATBED OR THE LIKE

[76] Inventor: Warren M. Mooney, P.O. Box 43, Standard, Calif. 95373

[21] Appl. No.: 807,751

[22] Filed: Dec. 11, 1985

[51] Int. Cl.⁴ ............................................ B65G 67/02
[52] U.S. Cl. ...................................... 414/389; 254/45; 296/35.3; 296/10; 296/164; 296/183; 414/495; 414/498; 414/401; 414/402
[58] Field of Search ............... 414/389, 349, 350, 401, 414/402, 498, 373, 572, 787, 786, 584, 485; 296/35.3, 164, 10, 184, 183; 254/45

[56] References Cited

U.S. PATENT DOCUMENTS

| | | | |
|---|---|---|---|
| 1,484,736 | 2/1924 | Patrick et al. | 254/45 X |
| 2,069,236 | 2/1937 | Fitch | 254/45 |
| 2,251,839 | 8/1941 | Dondlinger | 254/45 |
| 2,693,889 | 11/1954 | Fellabaum | 414/389 |
| 2,936,912 | 5/1960 | Black | 414/389 |
| 3,151,751 | 10/1964 | Marini | 414/572 |
| 3,240,368 | 3/1966 | Hankins et al. | 414/389 X |

FOREIGN PATENT DOCUMENTS

| | | | |
|---|---|---|---|
| 620086 | 5/1961 | Canada | 414/389 |
| 3124537 | 2/1983 | Fed. Rep. of Germany | 414/389 |
| 1229126 | 3/1960 | France | 414/389 |
| 701375 | 12/1953 | United Kingdom | 414/389 |
| 787521 | 12/1957 | United Kingdom | 414/389 |
| 958031 | 5/1964 | United Kingdom | 414/389 |
| 2031387 | 4/1980 | United Kingdom | 296/35.3 |

*Primary Examiner*—Frank E. Werner
*Attorney, Agent, or Firm*—Mark C. Jacobs

[57] ABSTRACT

Apparatus for converting a transfer truck to a flat bed or the like comprising a storage bin for aiding in removal of a truck module, such as a dump box, from a truck body, then storing the same until it is needed again. The apparatus includes upstanding side walls and a rear wall with a pair of ramps mounted to the rear wall and brackets at the front of the side walls. The ramps allow rollers on the dump box to roll up the ramp onto the top thereof and the brackets support the front of the dump box. the truck body can then be moved away from the dump box, after disengagement thereof, until it is desired to re-mount the dump box. Of course, other truck modules, such as water tanks, flat beds, etc. can be so mounted and de-mounted.

7 Claims, 10 Drawing Figures

APPARATUS FOR CONVERTING A TRANSFER TRUCK TO A FLATBED OR THE LIKE

BACKGROUND OF THE INVENTION

1. Field of the Invention

The invention relates to trucking apparatus; and, more particularly, to apparatus for quickly and easily removing a dump box or the like from the truck body of a transfer truck and storing it off of the truck body until needed on the truck body.

2. Description of the Prior Art

There is a need for more versatility in trucks. The trucks bodies of transfer trucks are quite expensive and a transfer truck is limited in its application. These trucks are limited in what they can carry. Since much labor and time is required to remove a flat bed or dump box from such trucks, most businesses must rent or buy a second truck to utilize the advantages of either a flat bed, dump box or other similar trucking modules.

There is a need for apparatus wherein a single driver, with little experience, can quickly and easily remove a dump box, water tank or flat bed or the like from the truck body of a transfer truck. This invention satisfies the need for easy removal of temporary disposition of a dump box.

SUMMARY OF THE INVENTION

It is an object of this invention to provide apparatus for converting a transfer truck from one type of truck to another.

It is a further object of this invention to quickly and easily remove a truck module, such as a dump box, from the truck body of a transfer truck.

It is still another object of this invention to carry out the foregoing object in such a manner that a single inexperienced operator can effect such removal.

It is still another object of this invention to store the removed module in a position ready for re-installation on the truck body when desired.

These and other objects are preferably accomplished by providing apparatus having upstanding side walls and a rear wall with a pair of ramps mounted to the rear wall and brackets at the front of the side-walls. The ramps allow rollers on the dump box to roll up the ramp onto the top thereof and the brackets support the front of the dump box. The truck body can then be moved away from the dump box, after disengagement thereof, until it is desired to re-mount the dump box. Of course, other truck modules, such as water tanks, flat beds, etc. can be so mounted and de-mounted.

DESCRIPTION OF THE PREFERRED EMBODIMENT

Figure 1:
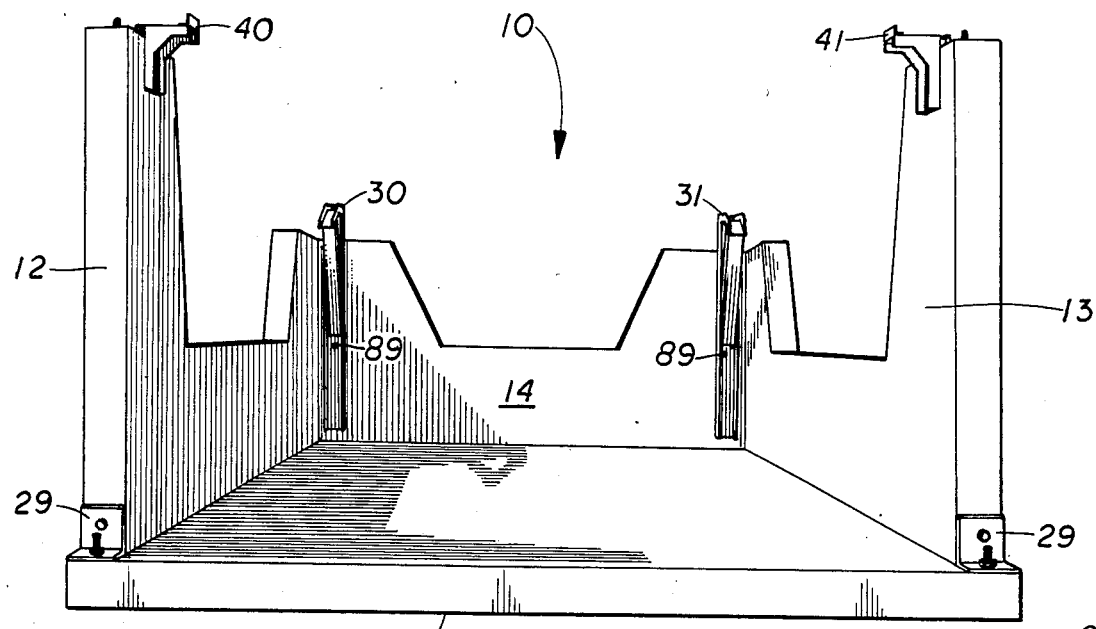
FIG. 1 is a perspective view of apparatus for carrying out the teachings of the invention.
Figure 2:
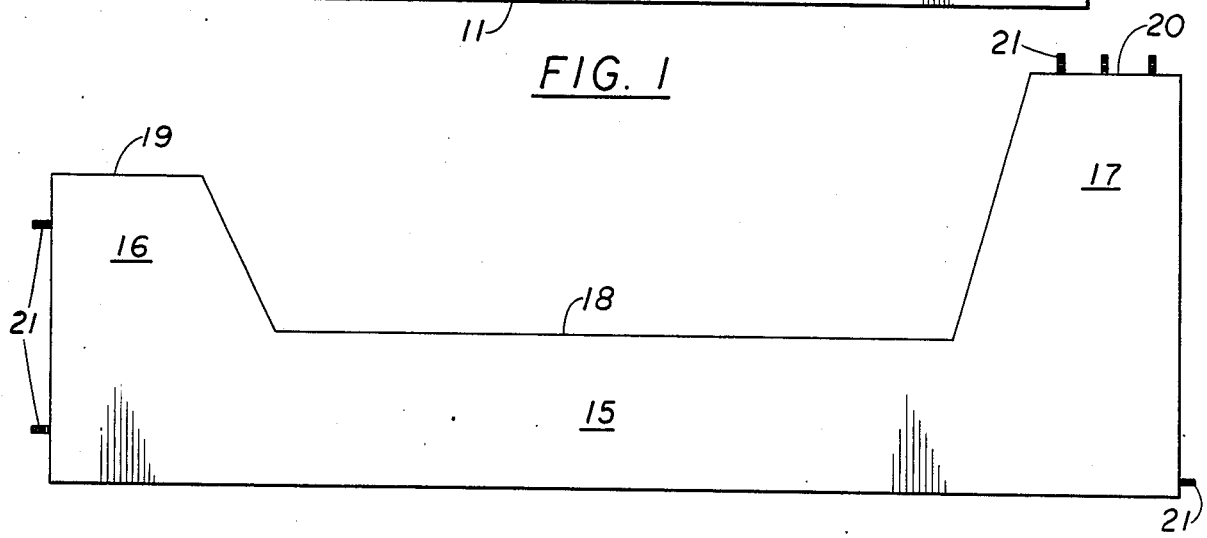
FIG. 2 is a vertical elevational view of one of the side walls of the apparatus of FIG. 1 removed therefrom for convenience of illustration.

Referring now to FIG. 1 of the drawing, apparatus 10 is shown comprising a planar flat bed or base 11, a pair of spaced upstanding side walls 12, 13, and a rear wall 14. As seen in FIG. 2, side wall 13 is shown and it is to be understood that side wall 12 is identical to side wall 13. Thus, each wall 12,13, such as wall 13 in FIG. 2, includes a bottom elongated portion 15 having trapezoidal-shaped portions 16,17 at each end forming therebetween an open section or cut-out area 18. The overall height of section 17 is higher than section 16. As will be discussed, the dimensions of apparatus 10 are chosen so as to conform the conventional trucking modules, such as dump boxes. Thus, each side wall 12,13 may be about 15' in length and about 4' high with section 17 being about 1'3" higher than section 16. The upper walls 19,20 of sections 16,17, respectively, may be about 2' long with a 1' taper from walls 20 to the point of junction to elongated portion 15. Elongated portion 15 may be about 2' in width and the wall thickness may be about 6".

The apparatus 10 dimensioned above, may be made out of concrete, requiring 22 cubic feet concrete. A plurality of steel reinforcing rods 21 may be embedded in the concrete to reinforce the same.

Figure 3:
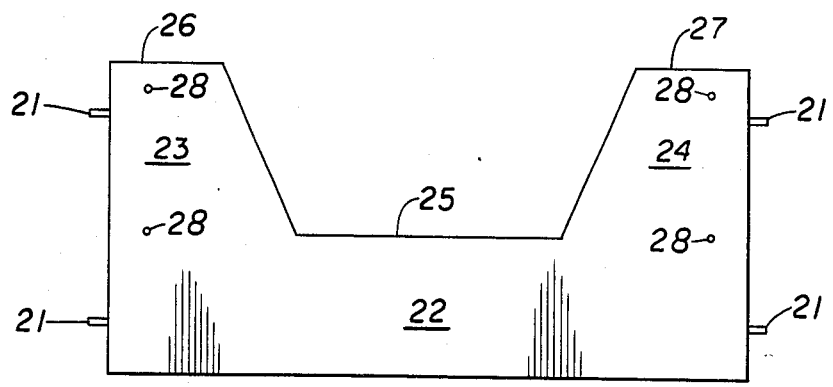
FIG. 3 is a vertical view of the rear wall of the apparatus of FIG. 1 removed therefrom for convenience of illustration.

As seen in FIG. 3, rear wall 14 also includes an elongated base portion 22 with trapezoidal-shaped sections 23,24 upstanding at each end forming a cut-out section 25 therebetween. The overall length of wall 14 may be about 8 and ½ feet and the overall height about 4', the length of upper walls 26,27 of sections 23,24, respectively, being about 1 and ½ feet with a 1' taper between sections 23,24 and its connection to base portion 22. Again, a plurality of steel reinforcing rods 21 may be provided in concrete wall 14 and wall 14 may also be provided with spaced holes or apertures 28. The side walls 12,13 may be connected to rear wall 14 in any suitable manner (or merely abut thereagainst) to form the open box-like structure shown in FIG. 1, all mounted on base 11. Angle irons 29 (FIG. 1) may be used to secure side walls 12,13 to base 11 (base 11 also being made of reinforced concrete).

Although a single apparatus is shown in FIG. 1, side walls 12,13 may be used to form side walls of successive such apparatuses. That is, rear wall 14 may be connected to a successive like rear wall with the side walls 12,13 forming common walls of successive apparatuses.

Figure 4:
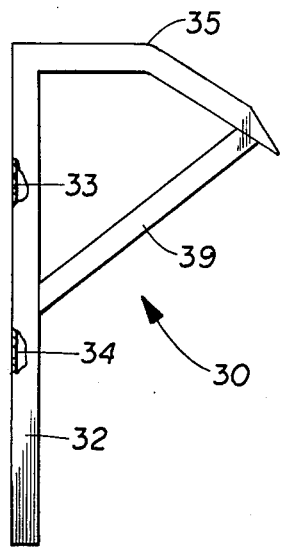
FIG. 4 is a vertical side view of a part of the apparatus of FIG. 1.
Figure 5:
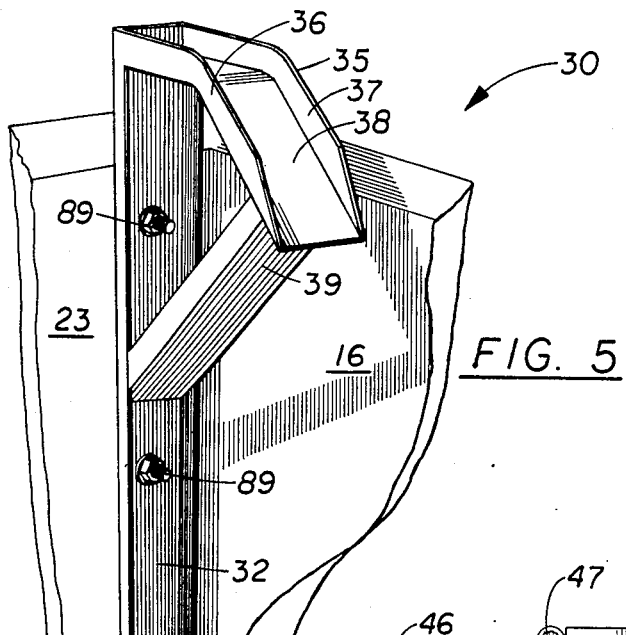
FIG. 5 is a perspective view of a portion of the apparatus of FIG. 1.

As seen in FIG. 1, a pair of brackets 30,31 are mounted to rear wall 14. As seen in FIG. 4, each bracket 30 or 31 (such as bracket 30) includes a vertical elongated portion 32 having spaced apertures 33,34 therethrough with a curved upper section 35. As seen in FIG. 5, upper section 35 is a ramp comprised of side walls 36,37 and ramp bed portion 38. As seen in FIG. 1, elongated portion 32 is secured to rear wall 14 by means of bolts 89 or the like passing through apertures 28 in wall 14 and apertures 33, 34 in elongated portion 32. A supporting brace 39 interconnects curved portion 35 to vertical portion 32.

The brackets 30, 31 may be made of suitable materials, such as angle iron.

Figure 6:
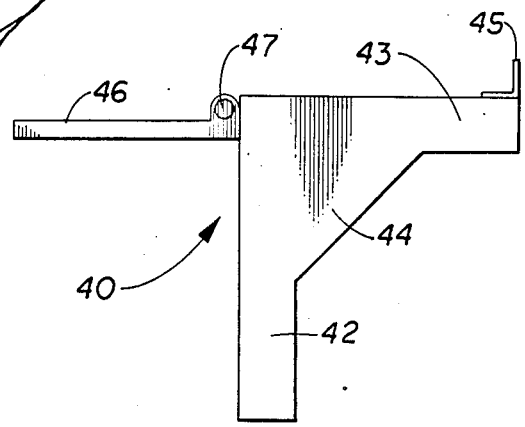
FIG. 6 is a side view of a portion of the apparatus of FIG. 1 removed therefrom for convenience of illustration.
Figure 7:
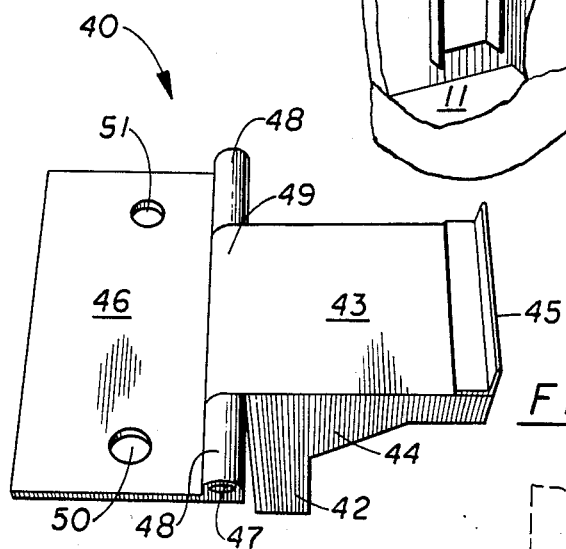
FIG. 7 is a top view of the device of FIG. 6.

As seen in FIG. 1, a pair of brackets 40,41 are disposed at each upper end 17 of apparatus 10. As illustrated in FIGS. 6 and 7, bracket 40, designated a 2nd bracket is illustrated with the bracket 41 identical thereto, each bracket includes a downwardly extending vertical angle flange 42 and a horizontal angle flange 43 extending from the upper end of flange 42 forming a right angle with a bracing member 44 therebetween. The forward end of flange 43 terminates in an upwardly extending lip 45 and plate 46 is pivotally connected to flange 43 rearwardly of lip 45 by pivot pin 47 extending through curved portions 48,49 of plate 46 and flange 43, respectively, as is well known in the art. As seen in FIG. 7, a pair of holes 50, 51 are provided in plate 46. Plates 46 thus overlie the top of each side wall 12, 13 as seen in FIG. 1 and are secured thereto.

Figure 8:
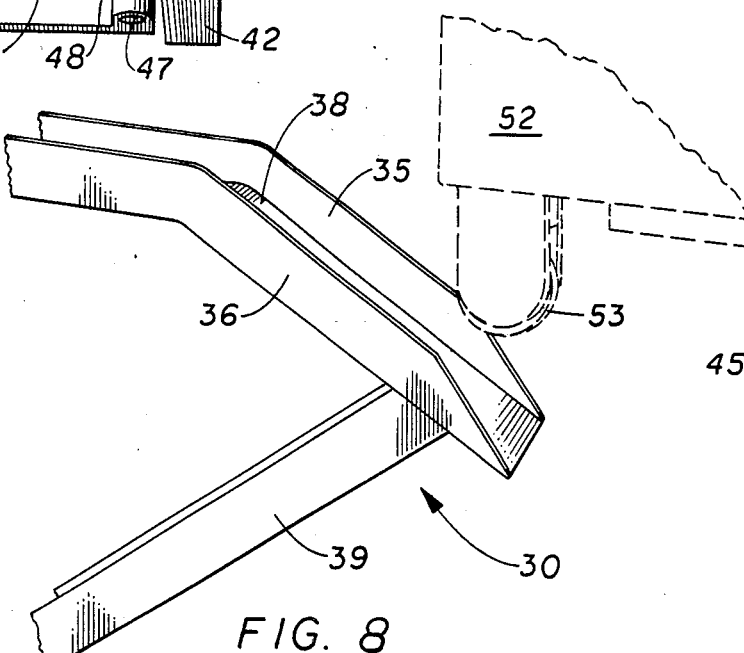
FIG. 8 is a perspective view of a portion of the apparatus of FIG. 1 illustrating one step in the loading of a dump box thereon.
Figure 9:
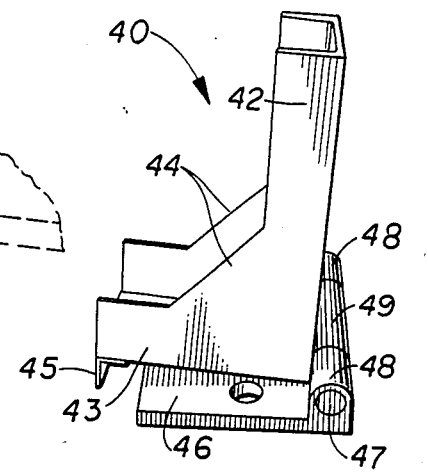
FIG. 9 is a perspective view of one position of the device of FIGS. 6 and 7.
Figure 10:
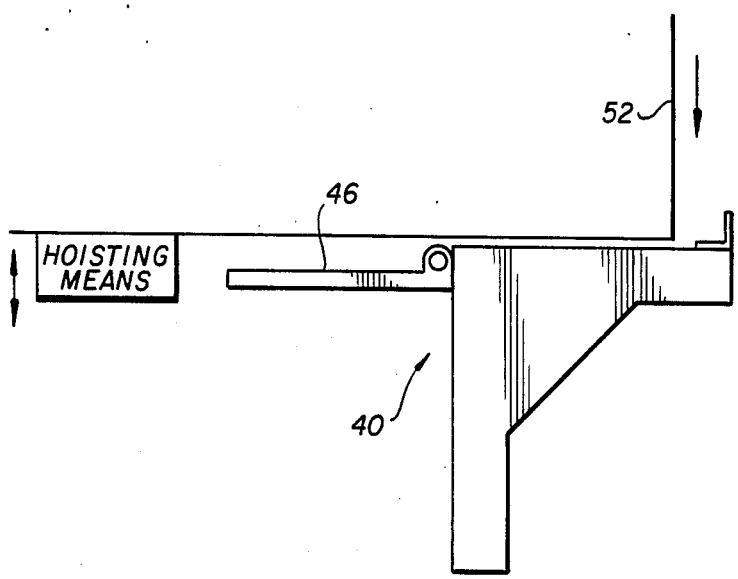

The operation of apparatus 10 will now be described. It is to be understood that the truck module desired to be unloaded from the truck body and loaded on to apparatus 10 is provided with wheels or rollers on the undersurface. Thus, as shown in FIG. 8, the rearward end of a dump box 52 is shown having downwardly extending rollers 53 at each rearward end. The hinge pin connecting the dump box to the subframe at the rear of the truck body is first removed. In operation, the truck body, carrying the dump box 52, is backed into the open area of apparatus 10 (FIG. 1) onto the upper surface of base 11. The rollers 53 are set in place onto the ramps 38, as shown in FIG. 8. The truck body moves dump box 52 backwards into apparatus 10 with rollers moving to the top upper surfaces 35 thereof. With conventional dump boxes, the box is lifted 5 and ½ inches off of its subframe. As seen in FIG. 9, each bracket 40,41 (bracket 40 shown in FIG. 9) is pivoted up onto its respective plate 46 and dump box 52 is raised up using the lifting hoist of the dump box over each bracket 40,41. The brackets 40, 41 are then pivoted back to the FIG. 1 position and dump box 52 is lowered so that its front end rests on the upper surfaces of flanges 43. See FIG. 10.

The dump box 52 is now released from the truck body by removal of the pins connecting the same to the lifting hoist and the truck body is driven off to be used with a flat bed alone or in other ways. The dump box 52 is stored or suspended in air on the apparatus 10, the reinforced concrete walls supporting the same. Obviously, the truck body can now be backed in, its lifting mechanism raised to engage the dump box 52 and lift it off of brackets 40, 41, the front brackets 40, 41 pivoted as heretofore discussed, the box lowered and engaged to the truck body and rollers 53 moving down ramps 38 off of apparatus 10.

Wood blocks may be used between the dump box (or other truck module) where necessary as shims to compensate for size difference or irregularities so as to align the same to the apparatus 10.

It can be seen that there is described apparatus for allowing a single operator to convert transfer trucks to flat beds or any number of other configurations within minutes. Channel iron can be used for the brackets 30,31,40 and 41. Anything from a flat platform to a water tank to a heavy duty rock box can be quickly and easily demounted or mounted to a truck body. The operator simply backs the truck into the apparatus 10, after removing the hinge pin of the dump box, lining up the wheels or rollers 53, with the channel iron ramps 38 of each bracket 30, 31. As the truck is backed the wheels ride to the top of the ramp lifting the rear of the dump box 5 and ½ inches above the subframe. The front of the box is then lifted with the trucks hydraulic lift, above the brackets 40 and 41. The brackets 40 and 41 are then pivoted down and the dump box is then lowered to rest on the brackets. The pins connecting the dump box to the trucks hydraulic lift are then removed. The operator then drives out from under the dump box leaving it suspended on the concrete walls.

Conventional dump boxes can be quickly and easily modified to be readily removable from its truck body to utilize the teachings of the invention. In conventional trucks, the truck is 8' wide so that the spacing of 8 and ½ feet (FIG. 3—length of wall 14) is selected accordingly to provide proper clearance.

There is thus disclosed apparatus for converting a transfer truck to a flat bed or the like in a quick and easy manner.

I claim:

1. In an apparatus for converting a transfer truck having a first truck module to a transfer truck ready to receive a second truck module, the invention comprising:
   a pair of upstanding spaced side walls;
   a rear wall interconnecting the side walls forming a large open area between all of the walls;
   a pair of vertically extending brackets mounted on said rear wall, one of said brackets being disposed adjacent the junction of said rear wall with one of said side walls and the other of said brackets being disposed adjacent the junction of said rear wall with the other of said side walls, each of said brackets having a first upstanding portion secured to said rear wall and a second upper portion extending first horizontally from the upper end of said first upstanding portion then curving downwardly forming a ramp;
   a pair of brackets mounted to the upper ends of each of said side walls at the forward ends thereof, each of said brackets including a flat plate secured to the upper surface of its respective side wall adjacent the end thereof remote from said rear wall and an angle flange pivotally secured to each of said flat plates, each of said flanges including a first portion pivotally connected to said flat plate and a second portion extending at generally a right angle to said first portion, one of said flat plates being secured to its respective side wall with its respective flange pivoting from a first position whereby its respective first portion overlies and abuts against said one of said flat plates to a second position whereby said respective first portion extends inwardly of said apparatus and generally coplanar with its respective flat plate, the other of said flat plates being similarly secured to its respective side wall with its respective flange pivoting from a first position whereby its respective first portion overlies and abuts against said one of said flat plates to a second position whereby said last mentioned respective first portion extends inwardly of said apparatus and generally coplanar with its respective flat plate and toward said first portion of said one of said flat plates;
   whereby the conversion is accomplished by having a transfer truck, having a truck module thereon which module has rolling means on its underside and a built in hoisting means, backing up into said apparatus to engage the ramps subsequent to the removal of the standard hinge pin that attaches the truck module to the subframe of the transfer truck, such that the rolling means engage the second upper portion and then the first upper portion of the brackets that define the ramps, thus lifting the truck module off its subframe;

the brackets mounted to the upper ends of the side walls of the apparatus, side wall brackets, are pivoted to their respective flat plates;

the truck module is raised up above said side wall brackets using the built in hoist of the transfer truck;

the side wall brackets are pivoted away from their respective flat plates;

the truck module is lowered down using the said hoist, to a position such that the module's front end rests on the side wall brackets thereby permitting the transfer truck, after disconnection of the hoisting means from the truck module, to be driven away forwardly without the truck module.

2. In the apparatus of claim 1 wherein said ramp includes a ramp bed having upstanding side walls thereon.

3. In the apparatus of claim 1 wherein said side walls and said rear wall are made of reinforced concrete.

4. In the apparatus of claim 3 wherein said brackets are of angle iron.

5. In the apparatus of claim 1 wherein each of said side walls includes a cut-out portion opening to the upper end thereof.

6. In the apparatus of claim 1 wherein said rear wall includes a cut-out portion opening to the upper end thereof.

7. In the apparatus of claim 1 including a flat base having said rear wall and said side walls upstanding therefrom.

* * * * *